US010595320B2

(12) United States Patent
Lear et al.

(10) Patent No.: US 10,595,320 B2
(45) Date of Patent: Mar. 17, 2020

(54) DELEGATING POLICY THROUGH MANUFACTURER USAGE DESCRIPTIONS

(71) Applicant: Cisco Technology, Inc., San Jose, CA (US)

(72) Inventors: Eliot Lear, Wetzikon (CH); Brian Weis, San Jose, CA (US); Richard Lee Barnes, II, Arlington, VA (US)

(73) Assignee: Cisco Technology, Inc., San Jose, CA (US)

( * ) Notice: Subject to any disclaimer, the term of this patent is extended or adjusted under 35 U.S.C. 154(b) by 100 days.

(21) Appl. No.: 15/726,961

(22) Filed: Oct. 6, 2017

(65) Prior Publication Data
US 2019/0110298 A1  Apr. 11, 2019

(51) Int. Cl.
| H04L 12/00 | (2006.01) |
| H04W 72/04 | (2009.01) |
| H04W 48/04 | (2009.01) |
| H04W 92/10 | (2009.01) |
| H04W 88/12 | (2009.01) |

(Continued)

(52) U.S. Cl.
CPC ......... H04W 72/0493 (2013.01); H04W 8/24 (2013.01); H04W 12/08 (2013.01); H04W 48/04 (2013.01); H04W 48/16 (2013.01); H04W 88/12 (2013.01); H04W 92/10 (2013.01)

(58) Field of Classification Search
CPC . H04W 72/0493; H04W 48/04; H04W 48/16; H04W 88/12; H04W 92/10; H04L 63/205; H04L 41/0893; H04L 63/20; H04L 63/101; H04L 65/1016

USPC .................. 709/229, 206, 225, 226; 726/26; 370/259
See application file for complete search history.

(56) References Cited

U.S. PATENT DOCUMENTS

| 7,565,324 B2 * | 7/2009 | Vincent ............... G06F 21/6218 370/337 |
| 8,086,508 B2 * | 12/2011 | Dheer .................... G06Q 40/00 705/35 |

(Continued)

OTHER PUBLICATIONS

Eliot Lear, "Manufacturer Usage Descriptions", Cisco, Apr. 4, 2016, 14 pgs.

(Continued)

*Primary Examiner* — Frantz Coby
(74) *Attorney, Agent, or Firm* — Edell, Shapiro & Finnan, LLC

(57) ABSTRACT

A process for implementing temporary rules for network devices is described. In one embodiment, the process includes a controller receiving a manufacturer usage description (MUD) identifier from a first device. The controller retrieves a MUD file associated with the MUD identifier. The controller registers a device identifier associated with the first device with a delegated controller determined based on the MUD file. The delegated controller is configured to generate a dynamic policy for the first device. The controller receives a dynamic policy from the delegated controller for the first device. The dynamic policy may be configured to permit a communication session between the first device and a second device. The controller forwards the dynamic policy to an access control device in communication with the first device to enable the access control device to permit the communication session between the first device and the second device.

20 Claims, 8 Drawing Sheets

(51) Int. Cl.
*H04W 48/16* (2009.01)
*H04W 12/08* (2009.01)
*H04W 8/24* (2009.01)

(56) References Cited

U.S. PATENT DOCUMENTS

| | | | | |
|---|---|---|---|---|
| 8,407,345 | B2* | 3/2013 | Lim | G06F 9/468 |
| | | | | 709/225 |
| 8,677,499 | B2* | 3/2014 | Lim | H04L 63/20 |
| | | | | 726/26 |
| 8,875,218 | B2* | 10/2014 | Lim | G06F 21/6218 |
| | | | | 726/1 |
| 8,955,035 | B2* | 2/2015 | Belinkiy | G06F 21/6218 |
| | | | | 726/1 |
| 8,990,329 | B1* | 3/2015 | Khvostichenko | G06Q 10/1095 |
| | | | | 709/206 |
| 9,398,051 | B2* | 7/2016 | Lim | G06Q 10/10 |
| 2002/0112186 | A1* | 8/2002 | Ford | H04L 63/101 |
| | | | | 726/7 |
| 2005/0132215 | A1* | 6/2005 | Wang | G06F 21/6218 |
| | | | | 726/26 |
| 2005/0262362 | A1* | 11/2005 | Patrick | H04L 63/0263 |
| | | | | 713/193 |
| 2007/0180490 | A1* | 8/2007 | Renzi | G06F 21/577 |
| | | | | 726/1 |
| 2014/0090012 | A1* | 3/2014 | Lim | G06Q 10/10 |
| | | | | 726/1 |
| 2014/0310769 | A1* | 10/2014 | O'Neill | H04L 63/10 |
| | | | | 726/1 |
| 2014/0317300 | A1* | 10/2014 | Ludwig | H04L 65/4069 |
| | | | | 709/226 |
| 2014/0380429 | A1* | 12/2014 | Matsugashita | H04L 63/0823 |
| | | | | 726/4 |
| 2016/0072839 | A1* | 3/2016 | Mortimore, Jr. | H04L 63/20 |
| | | | | 726/1 |
| 2016/0164979 | A1* | 6/2016 | Poscher | H04L 65/1016 |
| | | | | 370/259 |
| 2018/0316563 | A1* | 11/2018 | Kumar | H04L 41/0893 |
| 2018/0359255 | A1* | 12/2018 | Stair | H04L 63/10 |
| 2019/0089747 | A1* | 3/2019 | Wang | H04L 63/205 |

OTHER PUBLICATIONS

E. Lear, et al., "Manufacturer Usage Description Specification", draft-ieff-opsawg-mud-05, Network Working Group, Mar 8, 2017, 40 pgs.

M. Boucadair, et al., "Universal Plug and Play (UPnP)", Internet Gateway Device—Port Control Protocol Interworking Function, (IGD-PCP IWF), Internet Engineering Task Force (IETF), ISSN: 2070-1721, Jul. 2013, 23 pgs.

Alan Presser, et al., "UPnP Device Architecture 1.1", UPnP Forum, Revised: Oct. 15, 2008, 136 pgs.

D. Wing, Ed., et al., "Port Control Protocol (PCP)", Internet Engineering Task Force (IETF), ISSN: 2070-1721, Apr. 2013, 88 pgs.

M. Handley, et al., "SDP: Session Description Protocol", Network Working Group, Jul. 2006, 49 pgs.

* cited by examiner

DELEGATING POLICY THROUGH MANUFACTURER USAGE DESCRIPTIONS

TECHNICAL FIELD

This disclosure relates to using manufacturer usage descriptions to control network access of devices in a network.

BACKGROUND

An enterprise network connects computers and other devices within the network. Access to other networks, computers, or devices outside of the enterprise network is typically limited and controlled. Authorization for access outside of the enterprise network can be managed by access points, firewalls, or similar authorization devices that allow or deny access to/from devices on the network. Authorization may be implemented by using a policy that defines rules for specifying devices, types of access, and/or destinations that are permitted and/or prohibited for access outside of the enterprise network.

Some network devices can have predetermined usage descriptions that specify the description of the role of the device and various policies governing the behavior and permissions of the device. Predetermined usage descriptions can be referred to as being "manufacturer-driven" or "manufacturer-based" usage descriptions (MUDs) because they may indicate the manufacturer's operational requirements and/or intent for the corresponding network device.

DESCRIPTION OF EXAMPLE EMBODIMENTS

Overview

Presented herein is a process implementing temporary rules that control network access for network devices. In an example embodiment, the process may include a controller receiving a manufacturer usage description (MUD) identifier from a first device. The process may also include the controller retrieving a MUD file associated with the MUD identifier. The controller may register a device identifier associated with the first device with a delegated controller determined based on the MUD file. The delegated controller is configured to generate a dynamic policy for the first device. The controller may receive a dynamic policy from the delegated controller for the first device. The dynamic policy may be configured to permit a communication session between the first device and a second device. The controller may forward the dynamic policy to an access control device in communication with the first device to enable the access control device to permit the communication session between the first device and the second device.

In another example embodiment, the process may include a delegated controller receiving a device identifier associated with a first device. The delegated controller may establish communication with the first device. The delegated controller may determine a dynamic policy for the first device to conduct a communication session with a second device. The dynamic policy may be configured to permit the communication session between the first device and the second device. The delegated controller may transmit the dynamic policy to a controller that is in communication with an access control device for the first device.

Example Embodiments

Figure 1:
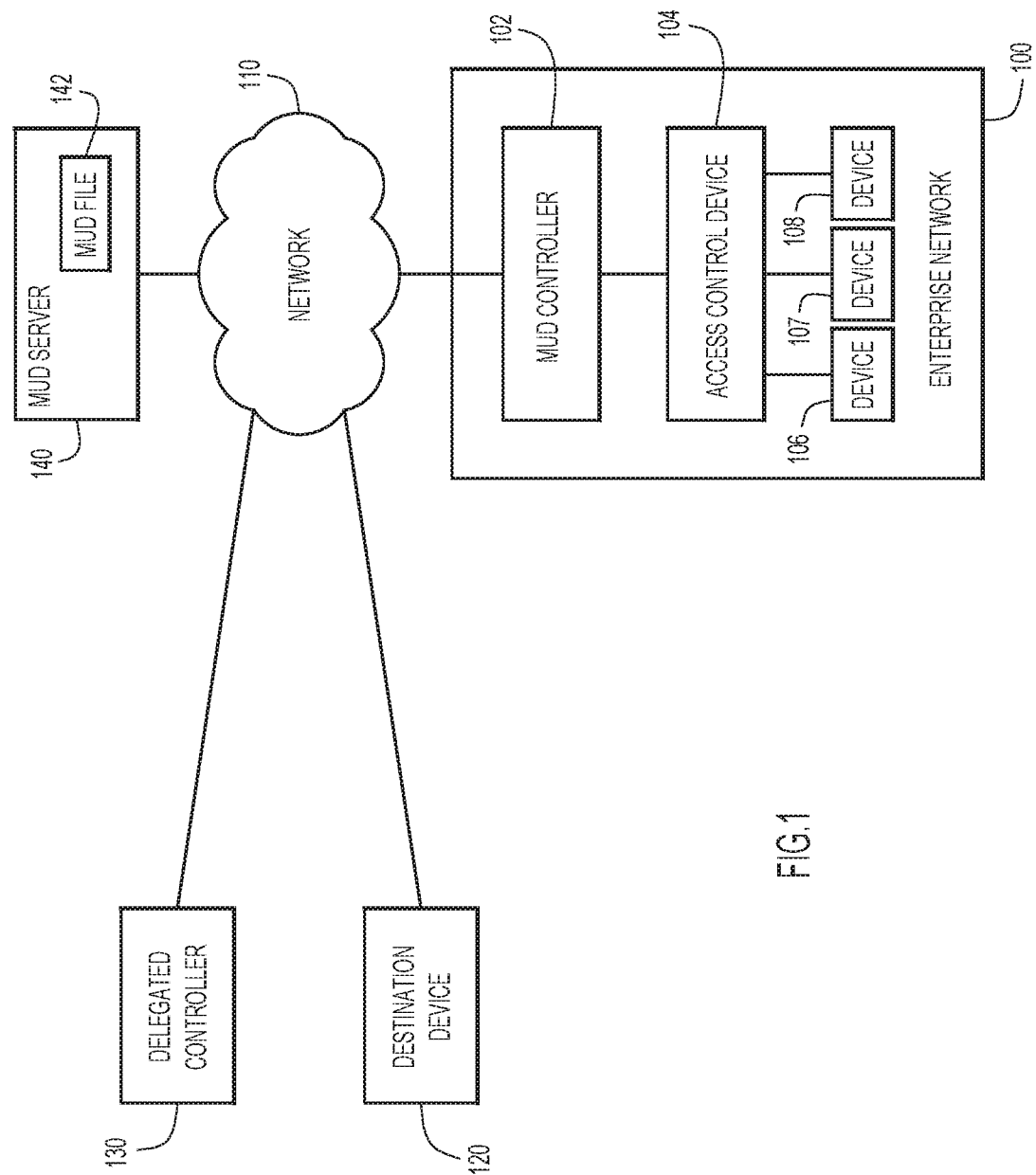
FIG. 1 is a block diagram showing an example of a network in which temporary rules for a network device may be employed, according to an example embodiment.

With reference made first to FIG. 1, FIG. 1 is a block diagram showing an example of an enterprise network 100 in which temporary rules that govern network access for a network device may be employed, according to an example embodiment. The enterprise network 100 includes a MUD controller 102, an access control device 104, and multiple network devices 106, 107 and 108. The term "network device" is meant to be interpreted broadly. For example, network devices may include various client devices employed by users within enterprise network 100. Some examples of network devices may include cameras, interactive whiteboards, and phones. However, one of ordinary skill in the art would readily recognize that the network device may be any type of device now known or hereinafter developed. Additionally, one of ordinary skill in the art would readily recognize that other network-capable devices may also be in enterprise network 100.

Network devices 106, 107, 108 may be connected to an access control device 104. Access control device 104 can be configured to permit or prohibit connected network devices 106, 107, 108 from communicating with other devices within enterprise network 100 and/or other devices outside of enterprise network 100. Some examples of access control device 104 may include an access point, switch, router, firewall, or other network security or authorization device that allows or denies access to/from devices on enterprise network 100.

In an example embodiment, access control device 104 may be in communication with a MUD controller 102. MUD controller 102 may be configured to control and manage enterprise network 100. In some cases, MUD controller 102 may receive instructions, or request approval, from a network administrator for enterprise network 100. MUD controller 102 may be configured to implement various network security policies to devices on enterprise network 100, including establishing a policy to access control device 104 for one or more network devices 106, 107, 108. A policy for network devices 106, 107, 108 may be based on predefined usage descriptions, as described in more detail below. As an example, one of the devices 106, 107, and 108 may desire connectivity with a destination device 120 outside of the enterprise network 100, via network 110.

Enterprise network 100 can be configured to communicate with one or more remote computers and/or devices over a communication network 110. Communication network 110 may be, for example, a local access network (LAN) or wide area network (WAN). Also, communication network 110 may be either wired, wireless, or a combination of wired and wireless. In an example embodiment, communication network 110 may be the Internet.

MUD controller 102 may be configured to implement one or more policies that provide rules regarding communication over communication network 110 by computers and/or devices on enterprise network 100. For example, a static policy implemented by MUD controller 102 may provide rules that restrict access to or from network devices 106, 107, 108 outside of enterprise network 100. In some cases, access may also be restricted between various network devices within enterprise network 100. The MUD controller 102 is in communication with a delegated controller 130, via network 110, and with a MUD server 140 that stores a MUD file 142. The interactions between the MUD controller 102 and the delegated controller 130 and the MUD server 140 are described in further detail below.

In an example embodiment, MUD controller 102 may implement rules based on predefined usage descriptions for network devices. Predetermined usage descriptions can specify a description of the role of a device and various policies governing the behavior and network access permissions of the device. Such predetermined usage descriptions may be provided by the device's manufacturer in a MUD file. In a MUD file, the device's manufacturer explicitly describes—the device and network access rules associated with the device (i.e., what its expected behavior is), such as in a standard eXtensible Markup Language (XML) or JavaScript Object Notation (JSON) Data Interchange Format file format. MUD controller 102 may create a security policy for the class of device described in the manufacturer's MUD file. For example, the MUD file may indicate that certain approved communications are allowed and all other communications are denied. MUD controller 102, upon approval from the network administrator, then merges the rules obtained from the MUD file into the existing network policies for enterprise network 100.

The MUD controller can retrieve a MUD file 142 from the MUD server 140. Network devices 106, 107, 108 can provide MUD controller 102 with a Uniform Resource Identifier (URI) that links to the device manufacturer's MUD server 140 to retrieve the associated MUD file 142. Accordingly, MUD controller 102 may retrieve one or more MUD files 142 from MUD server 140. MUD file 142 may have usage descriptions for specific network devices. For example, the MUD file 142 containing predefined usage descriptions for one or more of devices 106, 107 and 108.

In embodiments where network devices 106, 107, 108 are different types or classes of network devices, each MUD file for the specific network device may have different usage descriptions. In other embodiments, network devices 106, 107, 108 may be similar network devices or may belong to the same class of network device, in which case, the same MUD file may apply to each of network devices 106, 107, 108.

In an example embodiment, enterprise network 100 may further implement dynamic policies to establish temporary rules for a network device. For example, one of network devices 106, 107, 108 may attempt to establish a communication session with a destination device 120 located outside of enterprise network 100. Under existing network policy, access control device 104 may prohibit an attempted communication session between one of network devices 106, 107, 108 and destination device 120. According to the embodiments of the present application, MUD controller 102 may implement a dynamic policy that establishes temporary rules for network devices 106, 107, 108 so that access control device 104 will permit the communication session with destination device 120.

In an example embodiment, MUD controller 102 may delegate dynamic policy decisions to a trusted entity to provide temporary rules for network devices 106, 107, 108. The trusted entity may be a delegated controller 130. Delegated controller 130 may be a specific identified trusted device or may belong to a group or class of trusted devices. Trust in delegated controller 130 may be based on reputation, ownership, or through contractual enforcement. A device may be configured at the time of its manufacture or at deployment with the identity of an appropriate delegated controller to contact.

An appropriate delegated controller 130 may be identified or indicated in a MUD file so that its identity may be determined by MUD controller 102. For example, MUD file 142 associated with network devices 106, 107, 108 may include an entry designating delegated controller 130 as the trusted entity for implementing dynamic policy related to network devices 106, 107, 108. With this arrangement, MUD controller 102 may delegate dynamic policy decisions concerning network devices 106, 107, 108 to delegated controller 130. Delegated controller 130 may provide temporary rules to access control device 104 to allow one of network devices 106, 107, 108 to initiate a communication session with destination device 120.

Figure 2:
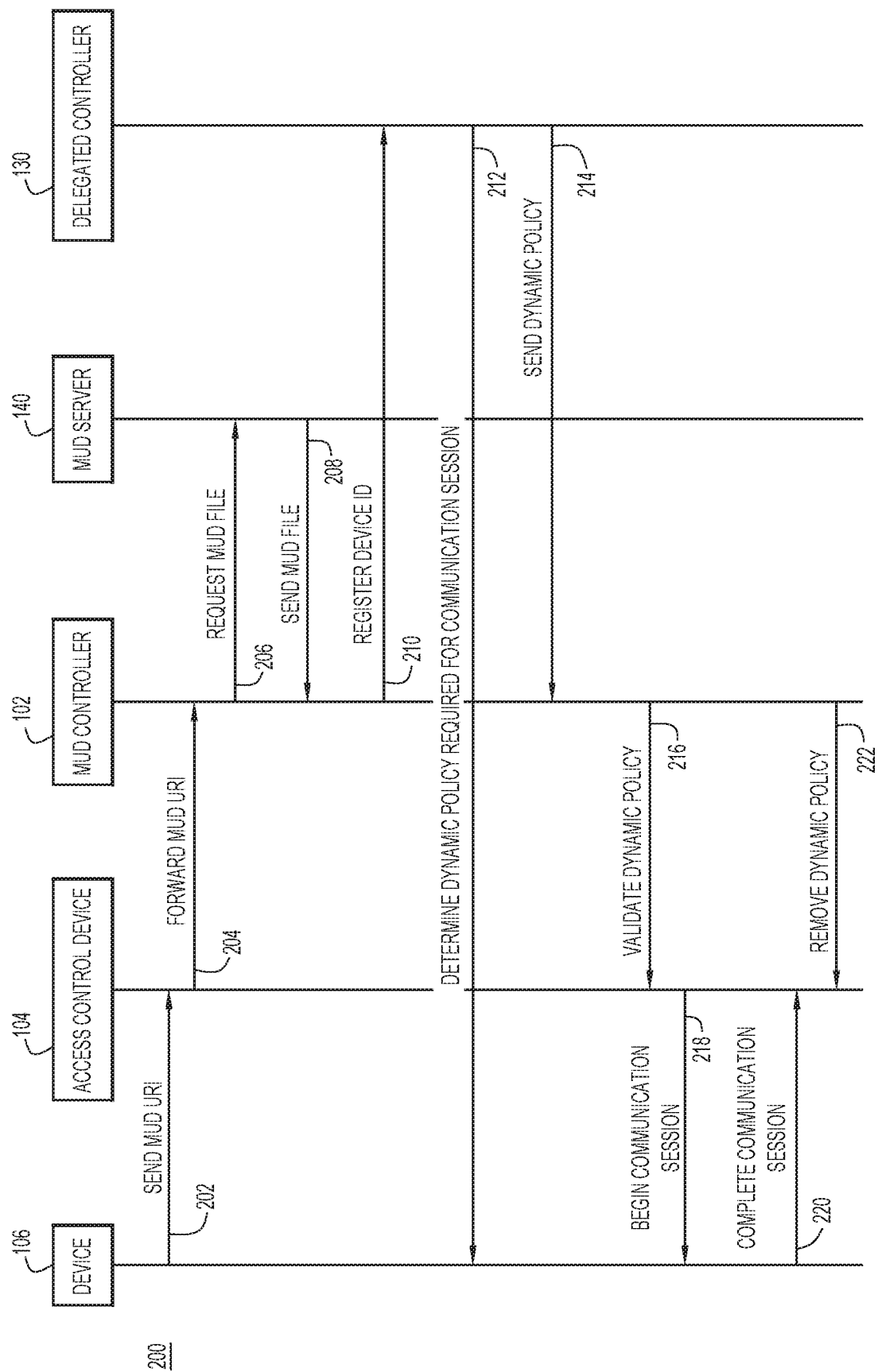
FIG. 2 is a sequence diagram illustrating a transactional flow between various elements of the network, according to an example embodiment.

Referring now to FIG. 2, a sequence diagram illustrating a process 200 involving the transactional flow between various elements according to example embodiments described herein is shown. Process 200 is an example embodiment for implementing temporary rules for network devices. In this embodiment, network device 106 may request a communication session with destination device 120. For example, network device 106 may be an interactive whiteboard attempting to connect with a media server in order to participate in a video conference session. Process 200, therefore, may be used to implement a dynamic policy for network device 106 to temporarily permit the communication session with destination device 120.

At operation 202, network device 106 may send its MUD identifier to access control device 104. The MUD identifier may be a URI that provides information regarding the device manufacturer's MUD server to retrieve the associated MUD file for network device 106.

At operation 204, access control device 204 may forward the MUD URI from network device 106 to MUD controller 102.

At operation 206, MUD controller 102 sends a request to the appropriate MUD server, for example, MUD server 140 identified by MUD URI from network device 106, to obtain MUD file 142 associated with network device 106.

At operation 208, MUD server 140 sends MUD file 142 for network device 106 to MUD controller 102.

MUD file 142 may be used by MUD controller 102 to determine the appropriate delegated controller 130 for network device 106. In an example embodiment, MUD file 142 may include an identifier designating delegated controller 130 as the trusted entity for implementing dynamic policy related to network device 106. In other embodiments, MUD file 142 may include an identifier designating a class of trusted entities for implementing dynamic policy related to network device 106. In some cases, MUD controller 102 may request permission from a network administrator of enterprise network 100 to approve delegated controller 130 and/or to admit hosts that are part of the delegated class as delegated controller 130.

Once the identity of delegated controller 130 is known and/or approved, at operation 210, MUD controller 102 registers a device identifier (ID) of network device 106 with delegated controller 130. For example, delegated controller 130 may have information regarding the 5-tuple including an Internet Protocol (IP) address and/or port for network device 106. Delegated controller 130 may also use other identifying information regarding network device 106, such as the device's media access control (MAC) address or a subject name from a certificate (e.g., an IEEE 802.1AR certificate).

In an example embodiment, MUD controller 102 may provide a static policy to access control device 104 describing that network device 106 is allowed to communicate with delegated controller 130.

In addition, at operation 210, MUD controller 102 may subscribe to events relating to network device 106 that have been registered with delegated controller 130. For example, using a suitable protocol, such as HyperText Transfer Protocol version 2 (HTTP/2) or Blocks Extensible Exchange Protocol (BEEP).

At operation 212, delegated controller 130 determines a dynamic policy to allow network device 106 to establish a communication session with destination device 120. The dynamic policy may include what additional access by network device 106 is needed, including with what hosts, and, on which ports, network device 106 needs to communicate with destination device 120 to initiate a communication session. For example, in the case where network device 106 may be an interactive whiteboard attempting to connect with a media server, delegated controller 130 may establish a dynamic policy to allow a communication session with the appropriate host to permit the whiteboard to contact and retrieve the requested media from the media server. In an example embodiment, the communication session may be a so-called "pinhole" between network device 106 and destination device 120.

Additionally, at operation 212, delegated controller 130 may also vet the request from network device 106. For example, delegated controller 130 may rate-limit requests, test the reputation of any requested destinations, or perform any other additional testing or security measures to vet the request from network device 106 before issuing a dynamic policy.

At operation 214, delegated controller 130 sends to MUD controller 102 the dynamic policy to allow network device 106 to establish a communication session with destination device 120. The dynamic policy may include one or more temporary rules configured to allow the communication session between network device 106 and destination device 120. The temporary rules may be similar to an access-control list/entity (e.g., permit access to/from source IP and/or port to/from destination IP and/or port). In an example embodiment, a tunneling or other suitable protocol may be used for communicating the dynamic policy from the delegated controller 130 to the MUD controller 102. If the Port Control Protocol (PCP) is used, additional options may be defined to specify the client using information other than IP address.

At operation 216, MUD controller 102 may validate the dynamic policy received from delegated controller 130. MUD controller 102 may check the dynamic policy to make sure the rules are safe, including checking for specific IP addresses with appropriate transport information, testing the reputation of any IP addresses or domain names, rate limiting requests, or other appropriate vetting of the dynamic policy. For example, when delegated controller 130 presents an access request to other devices within enterprise network 100, those other devices may be required to be of the same type or otherwise indicated to be used for the same purpose, such as the use of "controller" in a MUD file, for access to be granted.

Once MUD controller 102 has validated the dynamic policy, MUD controller 102 forwards the dynamic policy to access control device 104 for network device 106. The dynamic policy may be combined with the previous static policy provided by MUD controller 102 to access control device 104 in one access control list. In an example embodiment, MUD controller 102 may implement the dynamic policy by issuing a change of authorization (CoA) to access control device 104 for network device 106. The issued CoA to access control device 104 permits network device 106 to start a communication session and exchange packets with destination device 120.

At operation 218, the communication session between network device 106 and destination device 120 is allowed to begin by access control device 104. The communication session extends for a duration, which may be limited to a predetermined expiration time or otherwise limited to a specific purpose, such as transmission of one or more files. During the communication session, delegated controller 130 is monitoring the session between network device 106 and destination device 120.

At operation 220, the communication session between network device 106 and destination device 120 ends. When the communication session ends, network device 106 informs delegated controller 130, which has been monitoring the session. Delegated controller 130 then updates MUD controller 102 that the communication session has ended so that MUD controller can expire the temporary rules implemented by the dynamic policy.

At operation 222, MUD controller 102 removes the dynamic policy previously issued to access control device 104 upon expiration or termination of the communication session. In an example embodiment, MUD controller 102 may remove or revoke the dynamic policy by issuing another change of authorization (CoA) to access control device 104 for network device 106. The second CoA issued to access control device 104 revokes the temporary permission provided to network device 106 to have a communication session with destination device 120.

In one example embodiment, the dynamic policy from MUD controller 102 may include instructions for adding destination device 120 to an access control list associated with access control device 104 for network device 106. In this embodiment, the first issued CoA may instruct access control device 104 to add destination device 120 to the access control list as a device permitted to have access to network device 106. The second issued CoA may thus instruct access control device 104 to remove or delete destination device 120 from the access control list as a device with which network device 106 is not permitted to have access.

In some cases, a global access control list may be maintained for the computers and/or devices on enterprise network 100, including one or more of network devices 106, 107, 108. In such cases, the dynamic policy from delegated controller 130 to MUD controller 102 may be implemented by updating the global access control list. In other cases, access control lists may be localized so that only network devices that are connected to a particular access control device are listed in a localized access control list for that particular access control device. In these cases, the dynamic policy from delegated controller 130 to MUD controller 102 may be implemented by updating the localized access control list that is specific to the access control device for the particular network device that is being granted temporary permission for a communication session.

Additionally, scaling mechanisms may be applied to principles of the example embodiments described herein. In some cases, each device may be served by a unique access list. For scaling purposes, however, it may be difficult to provide unique access lists when the number of devices becomes large. Therefore, in such cases, for example, when ternary content-addressable memory (TCAM) is at a premium or when the length of an access control list (e.g., number of access control entities) becomes larger than appropriate for a particular access control device (e.g., a switch or router), one or more scaling mechanisms can be implemented, as will be described in more detail below.

In an example embodiment, one solution for a scaling mechanism may include constructing and maintaining a single access control list for all devices. The access control list may be updated as and when requests from delegated controller 130 are processed. According to this solution, there is only one access control list per access control device. However, this solution may allow similar devices to communicate with each other on specific media channels.

In an example embodiment, another solution for a scaling mechanism may include limiting admission to a certain number of devices at one time. According to this solution, the number of access control lists that could be constructed at any one time is limited based on available device resources. This solution may be appropriate for over-provisioned environments, but may lead to an inability to service requests outside of normal usage patterns.

In an example embodiment, another solution for a scaling mechanism may include tunneling of non-local traffic combined with network function virtualization (NFV) to further process packets at other endpoints. According to this solution, packet traffic not otherwise allowed may be tunneled to such endpoints, where it would be dropped or routed, as appropriate. This solution permits access decisions to be load balanced, however, it may add latency and require additional hardware to implement.

In an example embodiment, still another solution for a scaling mechanism may include localization of access control lists, as described above. According to this solution, only devices connected to a given access control device are listed in that access control device's access control list. This solution may be implemented without requiring additional hardware resources.

Figure 3:
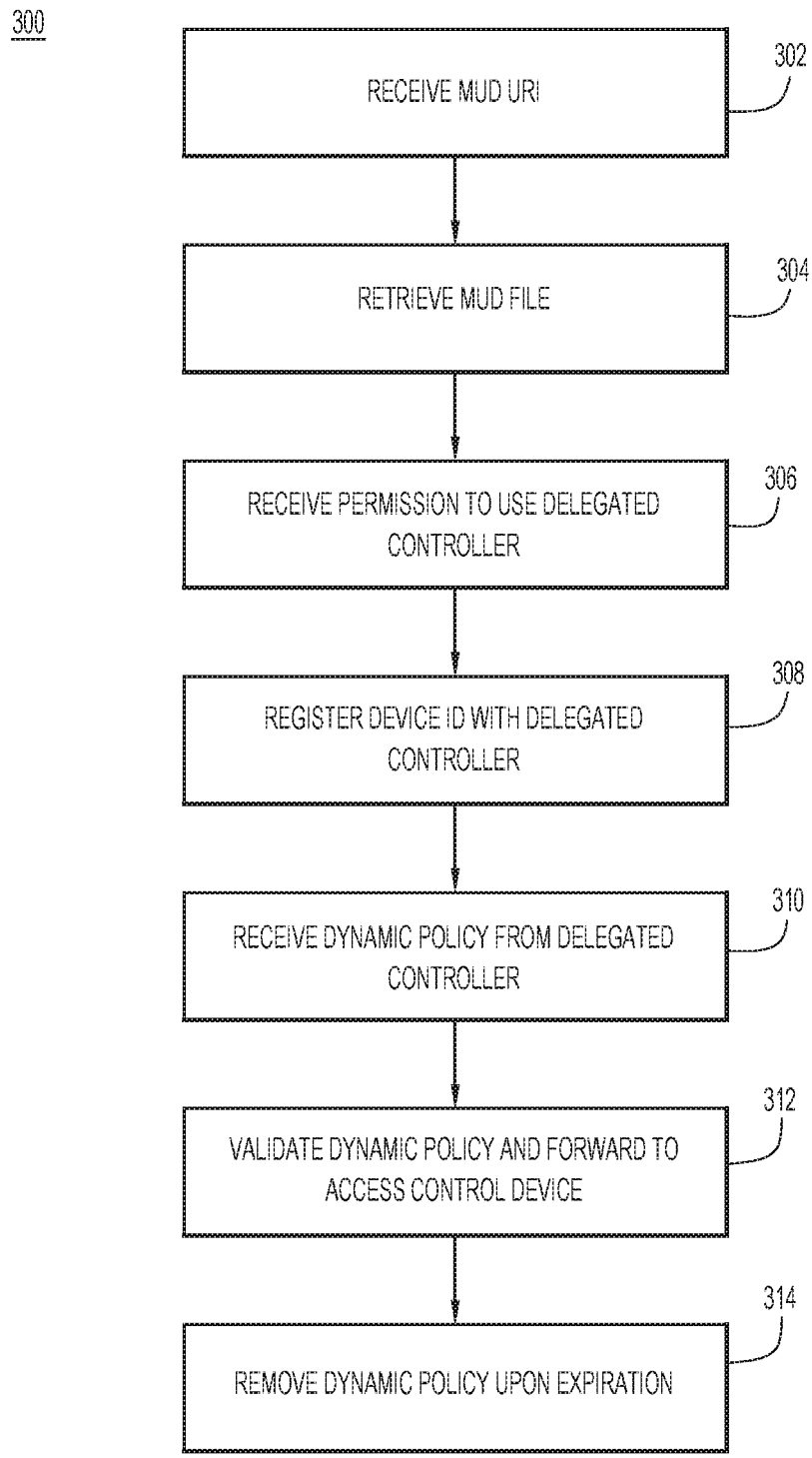
FIG. 3 is a flowchart of a method for implementing temporary rules for a network device by a controller of the enterprise network, according to an example embodiment.

Referring now to FIG. 3, a flowchart is shown of a method 300 for implementing temporary rules for a network device by MUD controller 102 of enterprise network 100, according to an example embodiment. At operation 302, MUD controller 102 receives a MUD identifier (e.g., the MUD URI) from network device 106. Using the MUD URI, which contains information regarding the device manufacturer's MUD server, MUD controller 102 contacts MUD server 140 and retrieves, at operation 304, the associated MUD file 142 for network device 106.

As described above, MUD file 142 may include a designated delegated controller or a designated delegated class of delegated controllers. MUD controller 102 reads MUD file 142 to determine the appropriate delegated controller for network device 106, in this example, delegated controller 130. At operation 306, MUD controller 102 may request permission or authorization from a network administrator for enterprise network 100 to use delegated controller 130.

At operation 308, MUD controller 102 registers a device identifier associated with network device 106 with delegated controller 130 that is configured to generate a dynamic policy for network device 106. As described above, the device identifier associated with network device 106 may be an IP address and/or port, a media access control (MAC) address, a subject name from a certificate (e.g., an 802.1AR certificate), or other suitable identification.

At operation 310, MUD controller 102 receives a dynamic policy from delegated controller 130 for network device 106. The dynamic policy implements temporary rules configured to permit a communication session between network device 106 and a second device, for example, destination device 120. For example, the temporary rules may permit a pinhole connection between network device 106 and destination device 120 for a communication session.

Next, at operation 312, MUD controller 102 may validate the dynamic policy received from delegated controller 130. As described above, validating the dynamic policy can include checking rules associated with the dynamic policy, testing a reputation of IP addresses or domain names associated with the dynamic policy, rate limiting requests, or other appropriate vetting of the dynamic policy. Once the dynamic policy has been vetted by MUD controller 102, MUD controller 102 is configured to forward the dynamic policy to access control device 104 in communication with network device 106 to permit the communication session between network device 106 and destination device 120.

In an example embodiment, MUD controller 102 may issue a CoA to access control device 104 to permit network device 106 to start the communication session with destination device 120. As noted above, the issued CoA may add network device 106 to an access control list associated with access control device 104.

At operation 314, MUD controller 102 removes the dynamic policy from access control device 104 for network device 106 when the communication session has ended. In an example embodiment, MUD controller 102 may issue a second CoA to access control device 104 to revoke temporary permissions that were granted to network device 106 during the communication session with destination device 120. As noted above, the second CoA may remove network device from an access control list associated with access control device 104.

Figure 4:
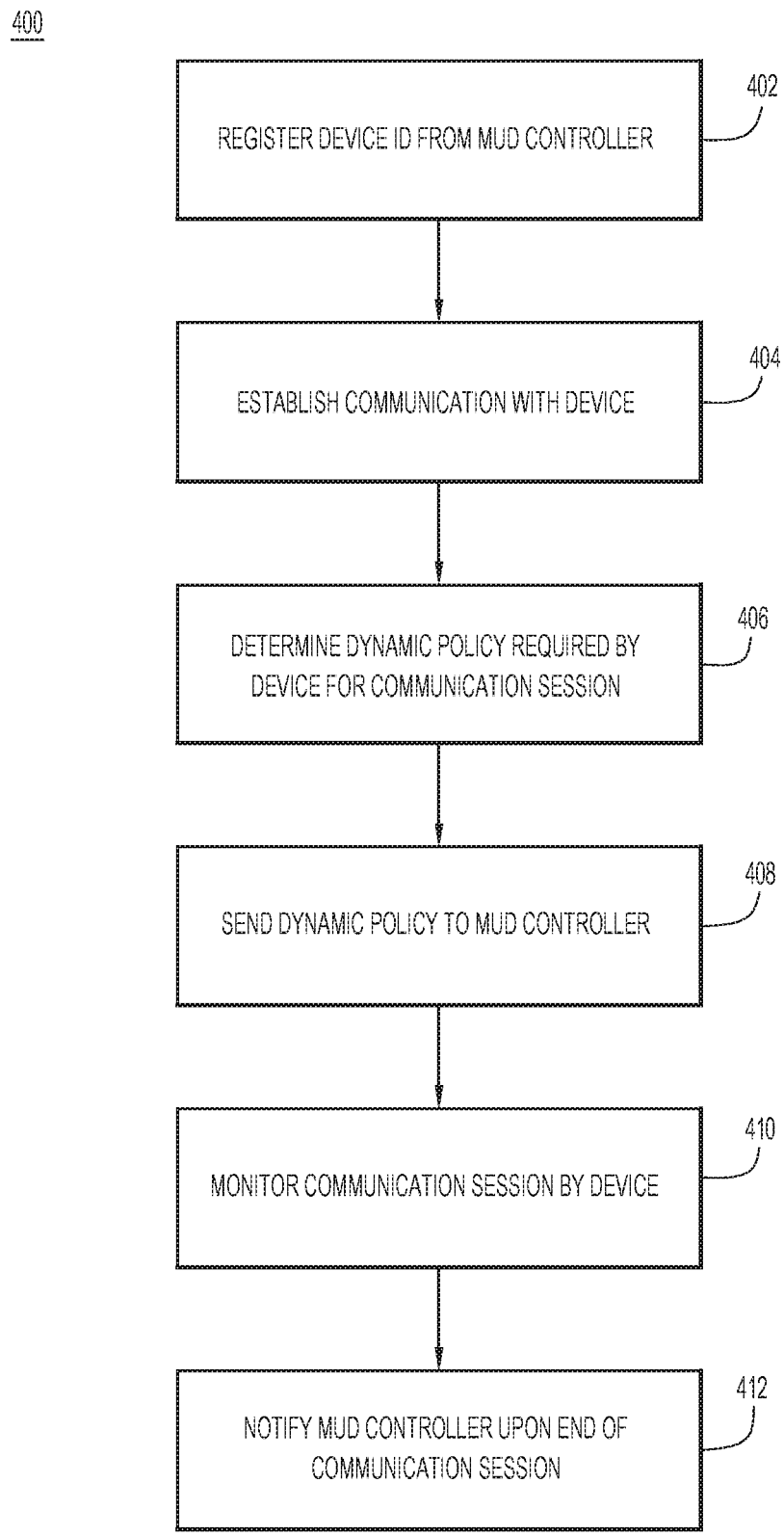
FIG. 4 is a flowchart of a method for implementing temporary rules for a network device by a delegated controller for the network device, according to an example embodiment.

Referring now to FIG. 4, a flowchart is shown of a method 400 for implementing temporary rules for a network device by delegated controller 130, according to an example embodiment. At operation 402, delegated controller 130 receives and registers a device identifier associated with network device 106 from MUD controller 102.

Next, at operation 404, delegated controller 130 establishes communication with network device 106.

At operation 406, delegated controller 130 determines, based on information from network device 106, a dynamic policy for network device 106 to permit a communication session between network device 106 and a second device, for example, destination device 120. For example, dynamic policy may implement temporary rules to permit a pinhole connection between network device 106 and destination device 120 for a communication session.

In an example embodiment, the dynamic policy may include at least information identifying an IP address and/or port for network device 106 and an IP address and/or port for destination device 120. The dynamic policy may include instructions for adding network device 106 to an access control list associated with access control device 104 for network device 106.

At operation 408, delegated controller 130 transmits the dynamic policy to MUD controller 102, which is in communication with access control device 104 for network device 106. MUD controller 102 and access control device 104 then implement the temporary rules according to the dynamic policy to permit the communication session between network device 106 and destination device 120.

At operation 410, delegated controller 130 may monitor the communication session between network device 106 and destination device 120. As part of operation 410, delegated controller 130 may continue to check and/or validate the communication session in accordance with temporary rules established by the dynamic policy.

At operation 412, delegated controller 130 notifies MUD controller 102 that the communication session between network device 106 and destination device 120 has expired or ended.

According to the example embodiments, MUD files may be extended to contain a statement that includes an identifier of a delegated controller or delegated class of controllers. For example, MUD files may contain a statement to the effect of "permit delegated policy server delegated-controller expiry n minutes" or "permit delegated policy class delegated-class expiry n minutes". Such statements in the MUD files may be encoded in JSON using a YANG schema or other data modeling language.

Figure 5A:
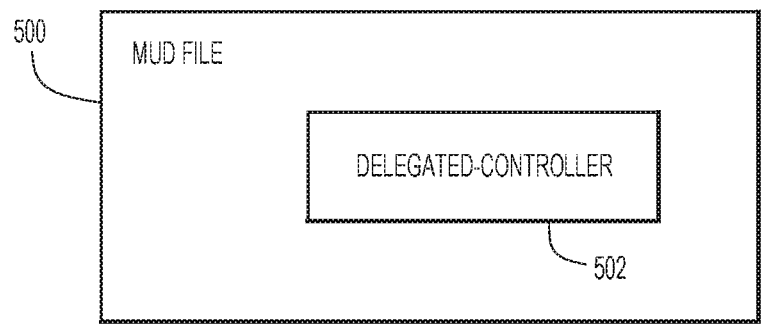
FIG. 5A is a diagram showing a manufacturer usage description (MUD) file containing a delegated controller entry, according to an example embodiment.
Figure 5B:
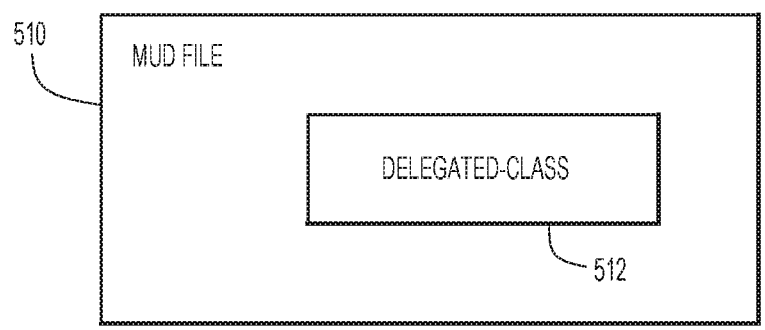
FIG. 5B is a diagram showing a manufacturer usage description (MUD) file containing a delegated class entry, according to an example embodiment.

Referring now to FIGS. 5A and 5B, example embodiments of MUD files are illustrated. FIG. 5A illustrates a diagram depicting an example of a MUD file 500 that includes, among other information, a delegated-controller identifier 502. Delegated-controller identifier 502 may include a name of the delegated controller for the network device associated with MUD file 500. The delegated controller is the trusted entity that a controller of an enterprise network delegates dynamic policy decisions to so as to provide temporary rules for network devices. For example, in the context of FIG. 1, MUD file 142 associated with network device 106 may include a delegated-controller identifier 502 that lists delegated controller 130 as the trusted entity for dynamic policy decisions regarding network device 106.

FIG. 5B illustrates a diagram depicting another example of a MUD file 510 that includes, among other information, a delegated-class identifier 512. Delegated-class identifier 512 may include a type or class of delegated controllers for the network device associated with MUD file 510. The type or class of delegated controllers may be a list of trusted entities that a controller of an enterprise network may delegate dynamic policy decisions to so as to provide temporary rules for network devices. For example, in the context of FIG. 1, MUD file 142 associated with network device 106 may include a delegated-class identifier 512 that includes delegated controller 130 as a member of the type or class of trusted entities for dynamic policy decisions regarding network device 106.

In some cases, permission from a network administrator for enterprise network 100 may be requested to approve a delegated controller and/or to admit hosts that are part of the delegated class as a delegated controller.

It should be understood that MUD files may contain additional information not explicitly described herein. For example, a MUD file for a network device in the form of an interactive whiteboard may appear as follows:

```
{
  "ietf-mud:mud": {
    "mud-url":
    "https://sparkcloud.example.com/.well-known/mud/v1/sparkboard",
    "last-update": "2017-08-30T17:50:49+02:00",
    "systeminfo":
    "https://sparkcloud.example.com/descriptions/sparkboard",
    "cache-validity": 48,
    "extensions": [
        "delegated-controller-extension"
    ],
    "delegated-controller":
    "delegated-controller.sparkcloud.example.com",
    "from-device-policy": {
      "access-lists": {
        "access-list": [
          {
            "acl-name": "mud-49252-v6fr",
            "acl-type": "ietf-access-control-list:ipv6-acl"
          }
        ]
      }
    },
    "to-device-policy": {
      "access-lists": {
        "access-list": [
          {
            "acl-name": "mud-49252-v6to",
            "acl-type": "ietf-access-control-list:ipv6-acl"
          }
        ]
      }
    }
  },
  "ietf-access-control-list:access-lists": {
    "acl": [
      {
        "acl-name": "mud-49252-v6to",
        "acl-type": "ipv6-acl",
        "access-list-entries": {
          "ace": [
            {
              "rule-name": "cl0-todev",
              "matches": {
                "ipv6-acl": {
                  "ietf-acldns:src-dnsname":
                  "api.sparkcloud.example.com"
                },
                "protocol": 6,
                "source-port-range": {
                  "lower-port": 443,
```

Figure 6:
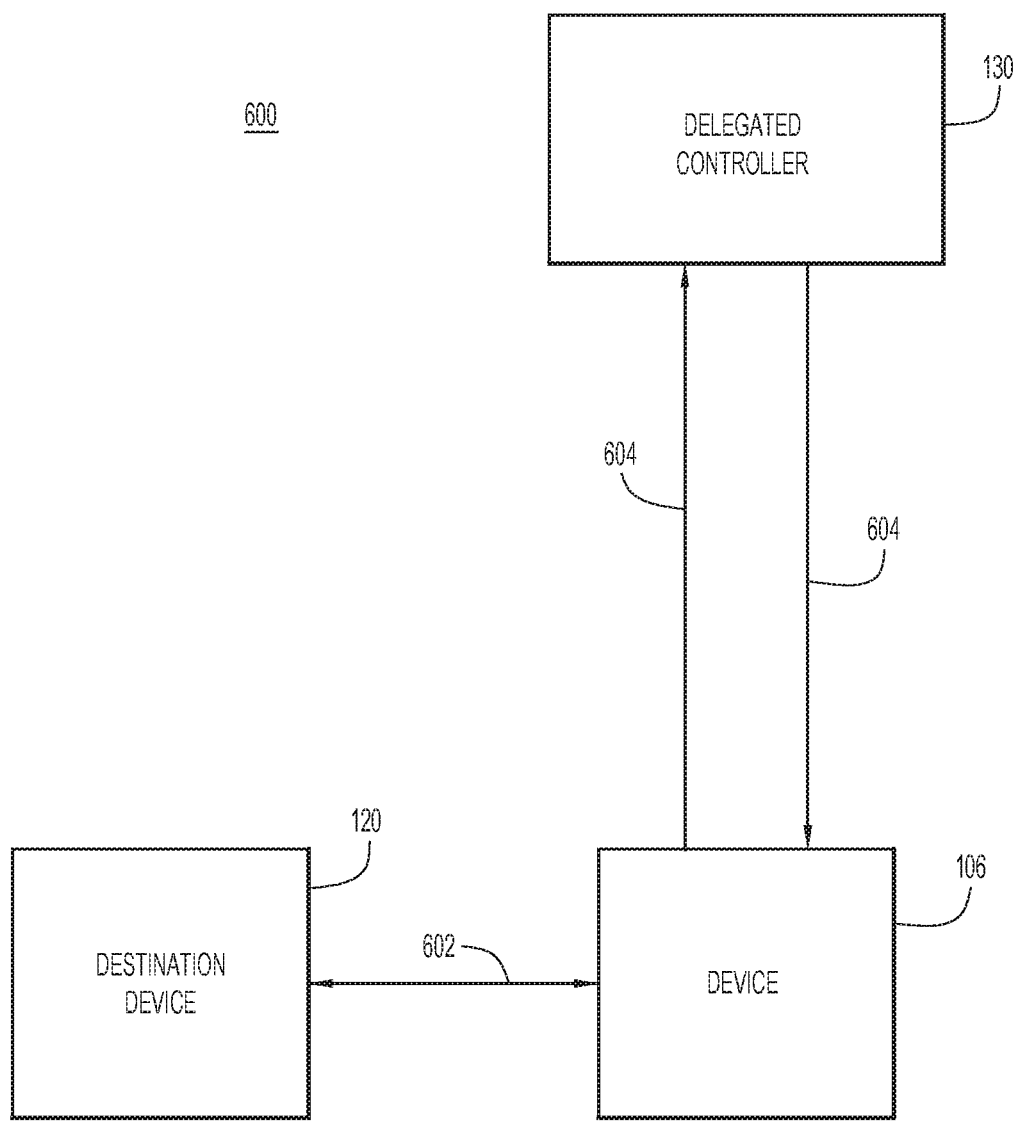
FIG. 6 is a functional diagram illustrating a delegated controller monitoring a communication session for a network device, according to an example embodiment.

FIG. 6 illustrates a functional diagram 600 of delegated controller 130 monitoring a communication session for network device 106, according to an example embodiment. In this embodiment, network device 106 is communicating with destination device 120 over a communication session 602. While communication session 602 between network device 106 and destination device 120 is open, delegated controller 130 is configured to monitor the session. Accordingly, delegated controller 130 may be configured to receive and/or transmit information from/to network device 106 over connection 604 during communication session 602. As noted above, when communication session 602 between network device 106 and destination device 120 expires or terminates, delegated controller 130 is configured to report the end of communication session 602 to MUD controller 102. This reporting by delegated controller 130 permits the dynamic policy that temporarily allowed communication session 602 between network device 106 and destination device 120 to be removed.

Figure 7:
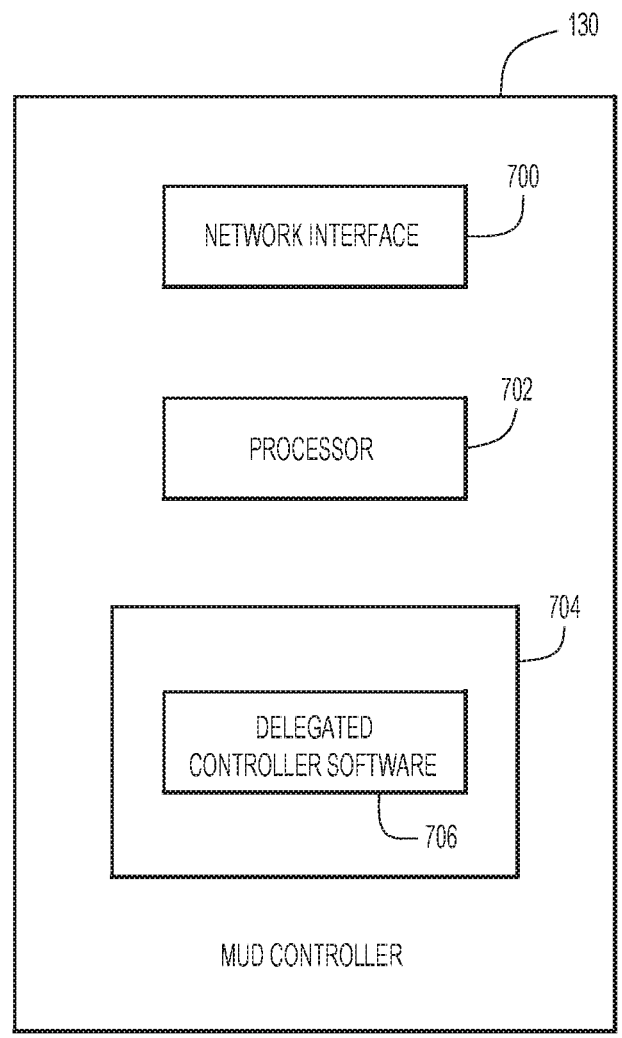
FIG. 7 is a block diagram of a delegated controller for the network device configured to implement temporary rules for network devices using the techniques described herein, according to an example embodiment.

Referring now to FIG. 7, FIG. 7 is a block diagram of a delegated controller 130 configured to implement temporary rules for network devices using the techniques described herein, according to an example embodiment. This delegated controller 130 may reside in a remote server or network located apart from enterprise network 100, and perform the operations described above with respect to FIGS. 1-6.

FIG. 7 illustrates an example embodiment of an apparatus of delegated controller 130 upon which the embodiments presented may be implemented. Delegated controller 130 includes a network interface 700, a processor 702 for processing information and may further include a bus (not shown) or other communication mechanism coupled with processor 702 for communicating the information. The network interface 700 may be, for example, one or more network interface cards configured to enable network communications. While the figure shows a single block 702 for a processor, it should be understood that the processor 702 may represent a plurality of processing cores, each of which can perform separate processing.

Delegated controller 130 may also include a main memory 704, such as a random access memory (RAM) or other dynamic storage device (e.g., dynamic RAM (DRAM), static RAM (SRAM), and synchronous DRAM (SD RAM)), coupled to the bus for storing information and instructions to be executed by processor 702. For example, delegated controller software 706 is stored in memory 704 for providing one or more of the functions of delegated controller 130 described herein. In addition, main memory 704 may be used for storing temporary variables or other intermediate information during the execution of instructions by processor 702.

Delegated controller 130 may further include other components not explicitly shown or described in the example embodiments. For example, delegated controller 130 may include a read only memory (ROM) or other static storage device (e.g., programmable ROM (PROM), erasable PROM (EPROM), and electrically erasable PROM (EEPROM)) coupled to the bus for storing static information and instructions for processor 702. Delegated controller 130 may also include a disk controller coupled to the bus to control one or more storage devices for storing information and instructions, such as a magnetic hard disk, and a removable media drive (e.g., floppy disk drive, read-only compact disc drive, read/write compact disc drive, compact disc jukebox, tape drive, and removable magneto-optical drive). The storage devices may be added to the delegated controller 130 using an appropriate device interface (e.g., small computer system interface (SCSI), integrated device electronics (IDE), enhanced-IDE (E-IDE), direct memory access (DMA), or ultra-DMA).

Delegated controller 130 may also include special purpose logic devices (e.g., application specific integrated circuits (ASICs)) or configurable logic devices (e.g., simple programmable logic devices (SPLDs), complex programmable logic devices (CPLDs), and field programmable gate arrays (FPGAs)), that, in addition to microprocessors and digital signal processors may individually, or collectively, are types of processing circuitry. The processing circuitry may be located in one device or distributed across multiple devices.

Delegated controller 130 performs a portion or all of the processing steps of the process in response to processor 702 executing one or more sequences of one or more instructions contained in a memory, such as main memory 704. Such instructions may be read into main memory 704 from another computer readable medium, such as a hard disk or a removable media drive. One or more processors in a multi-processing arrangement may also be employed to execute the sequences of instructions contained in main memory 704. In alternative embodiments, hard-wired circuitry may be used in place of or in combination with software instructions. Thus, embodiments are not limited to any specific combination of hardware circuitry and software.

As stated above, delegated controller 130 includes at least one computer readable medium or memory for holding instructions programmed according to the embodiments presented, for containing data structures, tables, records, or other data described herein. Examples of computer readable media are compact discs, hard disks, floppy disks, tape, magneto-optical disks, PROMs (EPROM, EEPROM, flash EPROM), DRAM, SRAM, SD RAM, or any other magnetic medium, compact discs (e.g., CD-ROM), or any other optical medium, punch cards, paper tape, or other physical medium with patterns of holes, or any other medium from which a computer can read.

Stored on any one or on a combination of non-transitory computer readable storage media, embodiments presented herein include software for controlling delegated controller 130, for driving a device or devices for implementing the process, and for enabling delegated controller 130 to interact with a human user (e.g., print production personnel). Such software may include, but is not limited to, device drivers, operating systems, development tools, and applications software. Such computer readable storage media further includes a computer program product for performing all or a portion (if processing is distributed) of the processing presented herein.

The computer code devices may be any interpretable or executable code mechanism, including but not limited to scripts, interpretable programs, dynamic link libraries (DLLs), Java classes, and complete executable programs. Moreover, parts of the processing may be distributed for better performance, reliability, and/or cost.

Figure 8:
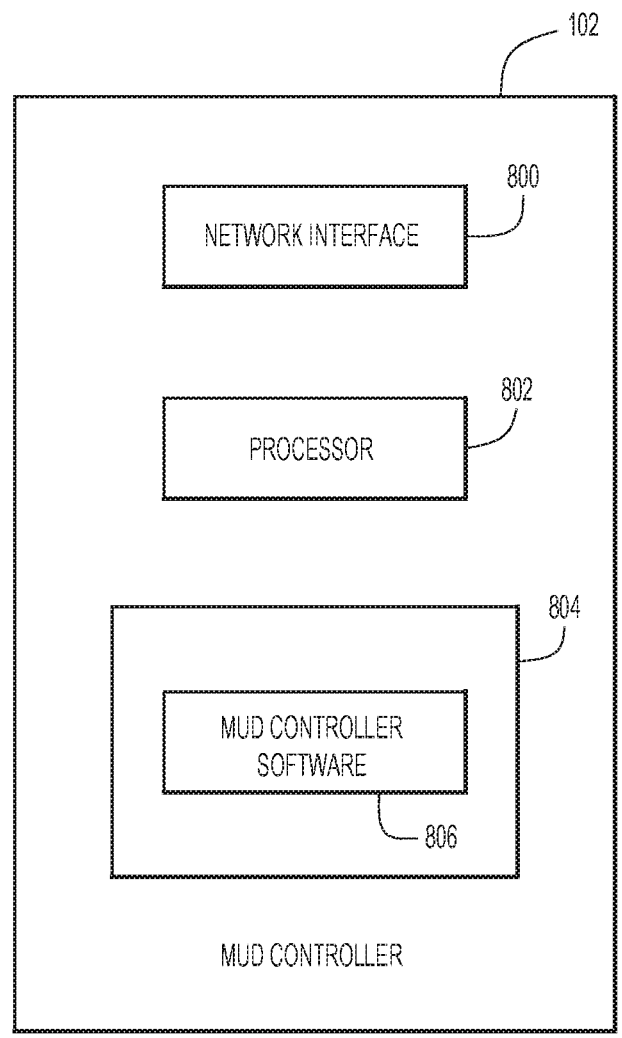
FIG. 8 is a block diagram of a controller of the enterprise network configured to implement temporary rules for network devices using the techniques described herein, according to an example embodiment.

Referring now to FIG. 8, FIG. 8 is a block diagram showing MUD controller 102 for enterprise network 100 configured to implement temporary rules for network devices using the techniques described herein, according to an example embodiment. This MUD controller 102 may reside in a server or computer on enterprise network 100, and perform the operations described above with respect to FIGS. 1-6.

FIG. 8 illustrates an example embodiment of an apparatus of MUD controller 102 upon which the embodiments presented may be implemented. MUD controller 102 includes a network interface 800, a processor 802 for processing information and may further include a bus (not shown) or other communication mechanism coupled with processor 802 for communicating the information. While the figure shows a single block 802 for a processor, it should be understood that the processor 802 may represent a plurality of processing cores, each of which can perform separate processing.

MUD controller 102 may also include a main memory 804, such as a RAM or other dynamic storage device (e.g., dynamic RAM (DRAM), static RAM (SRAM), and synchronous DRAM (SD RAM)), coupled to the bus for storing information and instructions to be executed by processor 802. For example, MUD controller software 806 is stored in memory 804 for providing one or more of the functions of MUD controller 102 described herein. In addition, main memory 804 may be used for storing temporary variables or other intermediate information during the execution of instructions by processor 802.

MUD controller 102 may further include other components not explicitly shown or described in the example embodiments. For example, MUD controller 102 may include a read only memory (ROM) or other static storage device (e.g., programmable ROM (PROM), erasable PROM (EPROM), and electrically erasable PROM (EEPROM)) coupled to the bus for storing static information and instructions for processor 802. MUD controller 102 may also include a disk controller coupled to the bus to control one or more storage devices for storing information and instructions, such as a magnetic hard disk, and a removable media drive (e.g., floppy disk drive, read-only compact disc drive, read/write compact disc drive, compact disc jukebox, tape drive, and removable magneto-optical drive). The storage devices may be added to MUD controller 102 using an appropriate device interface (e.g., small computer system interface (SCSI), integrated device electronics (IDE), enhanced-IDE (E-IDE), direct memory access (DMA), or ultra-DMA).

MUD controller 102 may also include special purpose logic devices (e.g., application specific integrated circuits (ASICs)) or configurable logic devices (e.g., simple programmable logic devices (SPLDs), complex programmable logic devices (CPLDs), and field programmable gate arrays (FPGAs)), that, in addition to microprocessors and digital signal processors may individually, or collectively, are types of processing circuitry. The processing circuitry may be located in one device or distributed across multiple devices.

MUD controller 102 performs a portion or all of the processing steps of the process in response to processor 802 executing one or more sequences of one or more instructions contained in a memory, such as main memory 804. Such instructions may be read into main memory 804 from another computer readable medium, such as a hard disk or a removable media drive. One or more processors in a multi-processing arrangement may also be employed to execute the sequences of instructions contained in main memory 804. In alternative embodiments, hard-wired circuitry may be used in place of or in combination with software instructions. Thus, embodiments are not limited to any specific combination of hardware circuitry and software.

As stated above, MUD controller 102 includes at least one computer readable medium or memory for holding instructions programmed according to the embodiments presented, for containing data structures, tables, records, or other data described herein. Examples of computer readable media are compact discs, hard disks, floppy disks, tape, magneto-optical disks, PROMs (EPROM, EEPROM, flash EPROM), DRAM, SRAM, SD RAM, or any other magnetic medium, compact discs (e.g., CD-ROM), or any other optical medium, punch cards, paper tape, or other physical medium with patterns of holes, or any other medium from which a computer can read.

Stored on any one or on a combination of non-transitory computer readable storage media, embodiments presented herein include software for controlling MUD controller 102, for driving a device or devices for implementing the process, and for enabling MUD controller 102 to interact with a human user (e.g., print production personnel). Such software may include, but is not limited to, device drivers, operating systems, development tools, and applications software. Such computer readable storage media further includes a computer program product for performing all or a portion (if processing is distributed) of the processing presented herein.

The principles of the example embodiments described herein can further extend manufacturer usage descriptions to provide for policy delegation to one or more servers (e.g., delegated controllers) so that specific, temporary rules may be applied to an access control device (e.g., firewall, switch, or similar). The delegated controller for a device attests to the validity of the temporary rules so that device itself is not self-asserting.

The example embodiments permit delegation of policy to a system (e.g., delegated controller or delegated class) that is known to be trusted and accountable by an enterprise network administrator.

The example embodiments leverage the MUD file server to outsource policy decisions to authorized systems (e.g., delegated controller or delegated class) that have sufficient application intelligence to protect complex clients, and, can allow complex systems to be managed through manufacturer usage descriptions.

The example embodiments provide an automated introduction to the outsourced policy server (e.g., delegated controller or delegated class) through the MUD file.

The example embodiments allow a delegated controller to inspect context, if not content, of communications, where proxies are not being used.

The principles of the example embodiments can provide a way to scale network protection of complex devices that may require otherwise seemingly random communications. For example, interactive whiteboards may request nearly random media connections that are not easily classified. A delegated controller for the interactive whiteboard may determine what connections are required and inform the MUD controller and/or manage access control. As another example, cameras may first connect to a cloud server for provisioning and assignment of IP addresses with which to communicate, complicating firewall management. In this case, the cloud server may serve as the delegated controller to manage the cameras. As another example, a phone, such as a Session Initiation Protocol (SIP) based device, may have its call manager (or equivalent) listed as part of a delegated class of controllers for the device.

In summary, a method is provided comprising: receiving a manufacturer usage description (MUD) identifier from a first device; retrieving a MUD file associated with the MUD identifier; registering a device identifier associated with the first device with a delegated controller determined based on the MUD file, wherein the delegated controller is configured to generate a dynamic policy for the first device; receiving a dynamic policy from the delegated controller for the first device, the dynamic policy configured to permit a communication session between the first device and a second device; and forwarding the dynamic policy to an access control device in communication with the first device to enable the access control device to permit the communication session between the first device and the second device.

In another form, a non-transitory computer readable storage media is provided that is encoded with instructions which, when executed by a processor, cause the processor to perform operations including: receiving a manufacturer usage description (MUD) identifier from a first device; retrieving a MUD file associated with the MUD identifier; registering a device identifier associated with the first device with a delegated controller determined based on the MUD file, wherein the delegated controller is configured to generate a dynamic policy for the first device; receiving a dynamic policy from the delegated controller for the first device, the dynamic policy configured to permit a communication session between the first device and a second device; and forwarding the dynamic policy to an access control device in communication with the first device to enable the access control device to permit the communication session between the first device and the second device.

In addition, a method is provided comprising: receiving a device identifier associated with a first device; establishing communication with the first device; determining a dynamic policy for the first device to conduct a communication session with a second device, the dynamic policy configured to permit the communication session between the first device and the second device; and transmitting the dynamic policy to a controller that is in communication with an access control device for the first device.

Furthermore, an apparatus is provided comprising: a communication interface configured to enable network communications; a processor coupled with the communication interface, and configured to: receive a manufacturer usage description (MUD) identifier from a first device; retrieve a MUD file associated with the MUD identifier; register a device identifier associated with the first device with a delegated controller determined based on the MUD file, wherein the delegated controller is configured to generate a dynamic policy for the first device; receive a dynamic policy from the delegated controller for the first device, the dynamic policy configured to permit a communication session between the first device and a second device; and forward the dynamic policy to an access control device in communication with the first device to enable the access control device to permit the communication session between the first device and the second device.

Further still, an apparatus is provided comprising: a communication interface configured to enable network communications; a processor coupled with the communication interface, and configured to: receive a device identifier associated with a first device; establish communication with the first device; determining a dynamic policy for the first device to conduct a communication session with a second device, the dynamic policy configured to permit the communication session between the first device and the second device; and transmit the dynamic policy to a controller that is in communication with an access control device for the first device.

Moreover, in another form, a non-transitory computer readable storage media is provided that is encoded with instructions which, when executed by a processor, cause the processor to perform operations including: receiving a device identifier associated with a first device; establishing communication with the first device; determining a dynamic policy for the first device to conduct a communication session with a second device, the dynamic policy configured to permit the communication session between the first device and the second device; and transmitting the dynamic policy to a controller that is in communication with an access control device for the first device.

The above description is intended by way of example only. Although the techniques are illustrated and described herein as embodied in one or more specific examples, it is nevertheless not intended to be limited to the details shown, since various modifications and structural changes may be made within the scope and range of equivalents of the claims.

What is claimed is:

1. A method comprising:
    receiving a manufacturer usage description (MUD) identifier from a first device;
    retrieving a MUD file associated with the MUD identifier;
    registering a device identifier associated with the first device with a delegated controller determined based on the MUD file, wherein the delegated controller is configured to generate a dynamic policy for the first device;
    receiving the dynamic policy from the delegated controller for the first device, the dynamic policy configured to permit a communication session between the first device and a second device; and
    forwarding the dynamic policy to an access control device in communication with the first device to enable the access control device to permit the communication session between the first device and the second device.

2. The method according to claim 1, further comprising receiving permission from an administrator to use the delegated controller.

3. The method according to claim 1, further comprising validating the dynamic policy received from the delegated controller prior to forwarding the dynamic policy to the access control device.

4. The method according to claim 3, wherein validating the dynamic policy includes vetting rules associated with the dynamic policy.

5. The method according to claim 3, wherein validating the dynamic policy includes testing a reputation of an Internet Protocol (IP) address or domain name associated with the dynamic policy.

6. The method according to claim 1, wherein the MUD file includes an identifier of the delegated controller for the first device.

7. The method according to claim 1, wherein the MUD file includes an identifier of a delegated class for the first device; and
    wherein the delegated controller is a member of the delegated class.

8. The method according to claim 1, further comprising issuing a change of authorization to the access control device to permit the first device to start the communication session with the second device.

9. The method according to claim 1, further comprising removing the dynamic policy from the access control device.

10. The method according to claim 9, wherein removing the dynamic policy includes issuing a change of authorization to the access control device upon expiration of the communication session between the first device and the second device.

11. A method comprising:
    receiving a device identifier associated with a first device;
    establishing communication with the first device;
    determining a dynamic policy for the first device to conduct a communication session with a second device, the dynamic policy configured to permit the communication session between the first device and the second device; and
    transmitting the dynamic policy to a controller that is in communication with an access control device for the first device.

12. The method according to claim 11, further comprising monitoring the communication session between the first device and the second device.

13. The method according to claim 12, further comprising notifying the controller in communication with the access control device for the first device that the communication session between the first device and the second device has ended.

14. The method according to claim 11, wherein determining the dynamic policy includes determining that a pinhole is needed between the first device and the second device for the communication session.

15. The method according to claim 11, wherein the dynamic policy includes at least information identifying an Internet Protocol (IP) address and/or port for the first device and an IP address and/or port for the second device.

16. The method according to claim 11, wherein the dynamic policy includes instructions for adding the first device to an access control list associated with the access control device for the first device.

17. An apparatus comprising:
a communication interface configured to enable network communications; and
a processor coupled with the communication interface, and configured to:
 receive a manufacturer usage description (MUD) identifier from a first device;
 retrieve a MUD file associated with the MUD identifier;
 register a device identifier associated with the first device with a delegated controller determined based on the MUD file, wherein the delegated controller is configured to generate a dynamic policy for the first device;
 receive the dynamic policy from the delegated controller for the first device, the dynamic policy configured to permit a communication session between the first device and a second device; and
 forward the dynamic policy to an access control device in communication with the first device to enable the access control device to permit the communication session between the first device and the second device.

18. The apparatus according to claim 17, wherein the processor is further configured to validate the dynamic policy received from the delegated controller prior to forwarding the dynamic policy to the access control device.

19. The apparatus according to claim 18, wherein the processor is configured to validate the dynamic policy by at least one of vetting rules associated with the dynamic policy and testing a reputation of an Internet Protocol (IP) address or domain name associated with the dynamic policy.

20. The apparatus according to claim 17, wherein the processor is configured to identify the delegated controller for the first device based on information contained in the MUD file.

* * * * *